No. 839,476. PATENTED DEC. 25, 1906.
G. D. HARTLETT.
WATER TRANSPORTATION MEANS.
APPLICATION FILED JAN. 8, 1906.
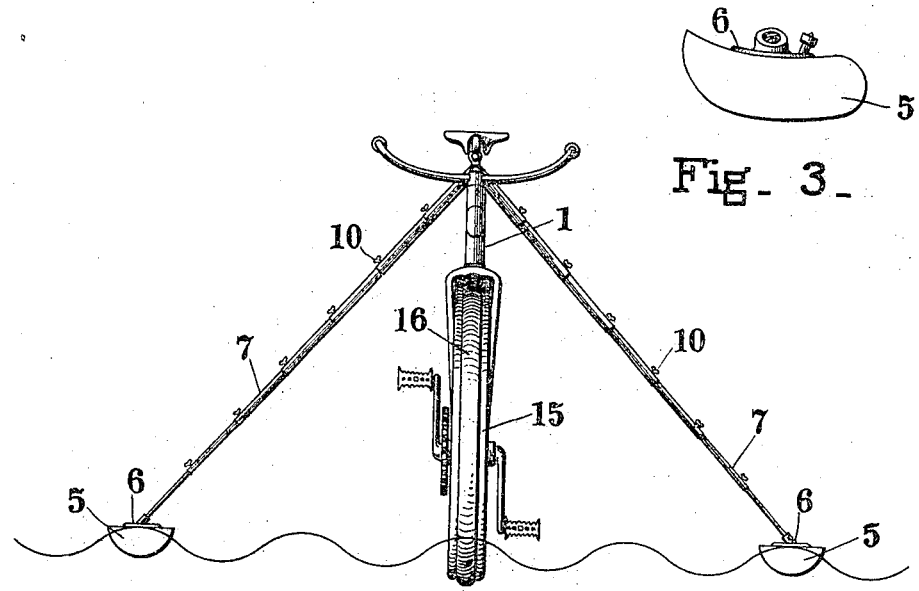
Fig. 3.
Fig. 2.
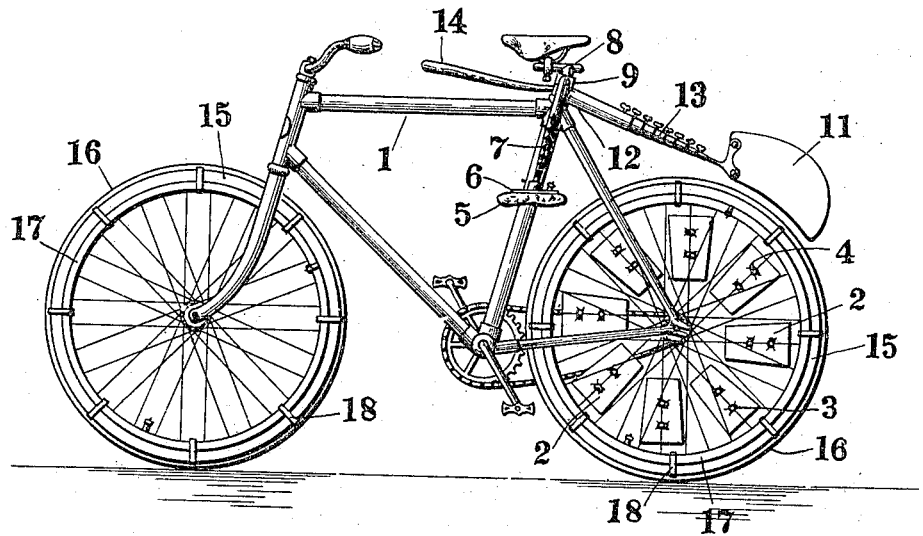
Fig. 1.
WITNESSES:
INVENTOR
George D. Hartlett
BY
Warfield O'Duell
ATTORNEYS

UNITED STATES PATENT OFFICE.

GEORGE D. HARTLETT, OF NEW ROCHELLE, NEW YORK.

WATER TRANSPORTATION MEANS.

No. 839,476.　　　Specification of Letters Patent.　　　Patented Dec. 25, 1906.

Application filed January 8, 1906. Serial No. 294,991.

*To all whom it may concern:*

Be it known that I, GEORGE D. HARTLETT, residing at New Rochelle, in the county of Westchester and State of New York, have invented certain new and useful Improvements in Water Transportation Means, of which the following is a full, clear, and exact description, such as will enable others skilled in the art to which it appertains to make and use the same.

This invention relates to water transportation means, and in more specific relation thereof to bicycles adapted for use on water.

One of the objects contemplated is the provision of means rendering possible the use of a bicycle upon water in addition to its use upon land.

Another object is the provision of means of the class indicated characterized by compactness in respect to the space occupied under the conditions of use and non-use, cheapness, and simplicity.

Another object is the provision of means of the class noted which may be conveniently associated with or disassociated from a bicycle and which may be readily adjusted, but which, nevertheless, it is unnecessary to remove when a bicycle is being employed upon land.

Other objects will be in part obvious and in part pointed out hereinafter.

The invention accordingly consists in the features of construction, combinations of elements, and arrangement of parts which will be exemplified in the device hereinafter described, and the scope of the application of which will be indicated in the following claims.

In the accompanying drawings, wherein is shown the preferred embodiment of my invention, Figure 1 is a side view thereof in collapsed condition and connected to a bicycle. Fig. 2 is a front view in operative condition. Fig. 3 is an enlarged view of one of its features.

Similar reference characters refer to similar parts throughout the several views.

It is believed that the general character and application of my invention will be apparent from the drawings and from the foregoing statement without the necessity for further explanation preliminary to a specific description of the embodiment shown. It may, however, be noted that, particularly in certain parts of the United States, the applicability of bicycles for touring purposes is restricted by the necessity for fording streams. My invention overcomes, among others, the restriction noted and at the same time provides an attractive feature adapted for use at parks, river gardens, and other places of entertainment where desirability for water transportation ordinarily exists.

Referring now to Fig. 1, the illustrative embodiment of the invention is shown in operative connection with a bicycle 1 of ordinary or desired construction which is in condition for use upon land, the various suspension, steering, and motive members being suitably arranged. A plurality of paddles 2 are shown secured to spokes of the rear wheel by thumb-screws 3, clamps or collars 4, which may be either integral with or auxiliary to the paddles and open at one side, so that the latter may be readily removed, encircling said spokes. These paddles may be of any desired size and are preferably made so that they will readily pass, when in a position transverse to the longitudinal direction of the wheel between rear forks of ordinary construction and separation.

As more clearly shown in Fig. 2, suspension members or boats 5 are provided, an enlarged view of the preferred form thereof being shown in Fig. 3. These are ordinarily made of thin rubber and have suitable aluminium plates 6 combined therewith provided with means for obtaining operative connection, as by a screw-threaded connection with members 7. These latter, as shown in Fig. 2, preferably comprise a series of aluminium rods adapted to telescope to obtain the form shown in Fig. 1 when in use upon land. The rods 7 may be secured in any desired manner to the bicycle-frame, and preferably to the seat-post 8. An arrangement which has been found very efficient is shown in Fig. 1, where the uppermost joints of the rods 7 are shown as screw-threaded into a collar 9 about the seat-post 8. The lowermost joints of the rod 7 are preferably also held in screw-threaded relation with the aluminium plates 6 upon the boats or suspension members 5. The construction shown accomplishes the result of compactly locating the various parts auxiliary to the bicycle proper, so as to avoid interference in operating the bicycle upon land. It also results when the rods 7 are extended, in which position they are held by suitable screws 10 10, in a relatively light and yet stiff and strong balancing and suspending means. A spoon or rudder 11 is suitably connected to a loose collar 12 about the seat-post through the interposition of connecting-rods 13, similar and operated in like manner to the rods 7. A lever or rudder handle 14 is associated with the collar 12. The length and angular arrangement of the rods 7 and 13 are such that when the loaded bicycle is on water the rudder 11 will extend about six inches below the surface, the boats 5 being located well to each side of the frame of the bicycle. It has been found desirable, in order that the latter may support a somewhat heavy rider on water and in order to avoid necessity for wetting the feet in operating the machine, to provide auxiliary suspension members 15, as shown in Fig. 2, which ordinarily consist of circular rubber tubes suitably secured at each side of the tires 16 to the rims 17 by flexible straps or retainers 18. The tubes 15 may either be merely deflated when the bicycle is upon land or entirely removed, being resecured upon necessity or desirability arising. It has been found that my construction when arranged as indicated, with the suspension and balancing boats 5 and both tires with their auxiliary air-cushions inflated, will support between one hundred and seventy-five and two hundred pounds upon water and that when supporting a load of that degree the pedals when revolving will not strike the water.

The character of the operation of the invention will be apparent from the foregoing; but the preferred mode of use may be stated. When the bicycle is to be used in crossing water, the auxiliary tubes 15 are inflated, their inflation-valves being secured as nearly as possible beneath the rims in order not to interfere with the frame of the bicycle, the rear forks of which are preferably wider apart than in usual constructions. The paddles 2 are positioned and held at right angles to the direction of their movement by the thumb-screws 4, and the rods 7 and 13 are extended to their full length, the parts thereof being held in rigid relation by similar thumb-screws. The boats 5 are likewise inflated and the bicycle as thus constituted launched. Somewhat larger auxiliary tubes may be used, if desired, upon the front wheel than upon the rear, inasmuch as it is unnecessary for the former to revolve, it being understood, however, that the tubes upon the rear wheel may be augmented or supplanted by a tube secured about the tire where extra heavy loads are to be carried or where otherwise desirable. Upon the application of force to the pedals the rear wheel revolves as upon land and the paddles act as an ordinary paddle-wheel.

It will accordingly be seen that I have provided a construction and arrangement of parts which are not only light and which may be readily removed from or applied to a bicycle and adjusted when secured thereto, but which result in the occupation of a minimum of space. The relative arrangement produces a maximum of suspension and buoyancy at the points where the greatest weight must be supported, and the motive and steering devices are so placed as not to interfere with operation, but yet to be capable of positive and efficient action. All cumbersome and inconvenient members are avoided, with the result that my invention accomplishes the objects and obviates the disadvantages among others hereinbefore pointed out.

The fact which is especially applicable to uninvolved constructions of this character should be obvious, that various changes in detail and in construction of parts may be made, that elements may be substituted, or other changes made in the construction illustrated which might materially change the appearance thereof while still involving the ideas and appropriating the utilities suggested by the invention here disclosed.

Having described my invention, what I claim as new, and desire to secure by Letters Patent, is—

1. In combination with a bicycle, collapsible buoyant suspension means, propelling means, and independent steering means.

2. In combination with a bicycle, buoyant suspension means collapsibly and adjustably secured thereto, a propeller actuated by the bicycle driving mechanism, and independent steering means.

3. In combination with a bicycle, collapsible buoyant suspension and balancing means, a propeller secured to the rear wheel, and steering means.

4. In combination with a bicycle, buoyant suspension and balancing means, a propeller comprising paddles rotatably secured to the spokes of a wheel, and independent steering means.

5. In combination with a bicycle, buoyant suspension and balancing means, propelling means actuated by the driving mehanism of said bicycle, a rudder and a rod secured thereto and to said bicycle.

6. In combination with a bicycle, buoyant suspension and balancing means, independent propelling means actuated by the driving mechanism of said bicycle, a rudder, and a collapsible rod secured thereto and to the seat-post.

7. In combination with a bicycle, buoyant suspension means secured to the wheels, a propeller, and independent steering means.

8. In combination with a bicycle, buoyant suspension means secured to the wheels, buoyant balancing means located upon each side of said bicycle and secured thereto by collapsible rods, a propeller, and a steering means.

9. In combination with a bicycle, collapsible floats, collapsible rods secured to said floats and to said bicycle, collapsible floats adjustably secured to the wheels of said bicycle, a propeller, and steering means.

10. In combination with a bicycle, a collapsible float located upon each side of said bicycle, collapsible rods connecting said floats to said bicycle, collapsible tubes secured about the wheels, a plurality of paddles secured to one of said wheels, a rudder, a collapsible rod connecting said rudder to the bicycle, and a lever actuating said rod.

11. In combination with a bicycle, pneumatic floats located upon both sides thereof, rigid collapsible rods secured to said floats and to the seat-post, independent pneumatic tubes adjustably secured to the wheels, a series of paddles adjustably and removably secured to the rear wheel and actuated by the driving mechanism of said bicycle, a rudder actuated by a lever secured to the seat-post, and a collapsible rod rigidly connecting said rudder to said lever.

12. In combination with a bicycle, pneumatic suspension means secured to the wheels thereof, pneumatic suspension and balancing means located at each side of said bicycle, collapsible rods secured to said latter means and to the bicycle, paddles adjustably secured to the rear wheel thereof and actuated by the bicycle driving mechanism, and steering means.

13. In combination with a bicycle, removable and collapsible buoyant suspension means secured to the wheels, a propeller, and independent steering means.

In testimony whereof I affix my signature in the presence of two witnesses.

GEORGE D. HARTLETT.

Witnesses:
ARTHUR G. FESSENDEN,
H. M. SEAMANS.